Dec. 12, 1950 D. L. HINGS 2,533,803

AUDIO CONTROLLED LIMITER

Filed Aug. 27, 1945

INVENTOR
Donald L. Hings
BY Woodling and Krost
ATTORNEYS.

Patented Dec. 12, 1950 2,533,803

UNITED STATES PATENT OFFICE 2,533,803

AUDIO CONTROLLED LIMITER

Donald L. Hings, Ottawa, Ontario, Canada, assignor, by mesne assignments, to Cornell-Dubilier Electric Corporation, South Plainfield, N. J., a corporation of Delaware Application August 27, 1945, Serial No. 612,923
In Canada August 13, 1945

7 Claims. (Cl. 250—20)

My invention relates in general to automatic limiters in radio receiving circuits and more particularly to audio controlled limiters.

An object of my invention is to limit spurious interference waves to an amplitude which is less than the maximum amplitude of the modulated carrier waves.

Another object of my invention is to eliminate spurious interference waves when there is no modulation of the carrier wave.

Another object of my invention is to vary the amount of the limiting of the spurious interference waves in accordance with audio power changes.

Another object of my invention provides for energizing the control circuits which eliminates or limits the spurious interference waves from modulated wave power instead of from the combination of audio wave power and spurious interference wave power.

Another object of my invention is to provide for balancing out the high audio frequency, low amplitude interference waves which may be characterized as those producing background noise.

Another object of my invention is to control the value at which the audio energy is limited in accordance with the power of the carrier wave.

Another object of my invention is to inversely amplify and automatically limit the audio output from a detector circuit.

Other objects and a fuller understanding of my invention may be had by referring to the following description and claims, taken in conjunction with the accompanying drawings in which, Fig. 1 shows a diagrammatic illustration of a circuit embodying the features of my invention;

Figure 1:
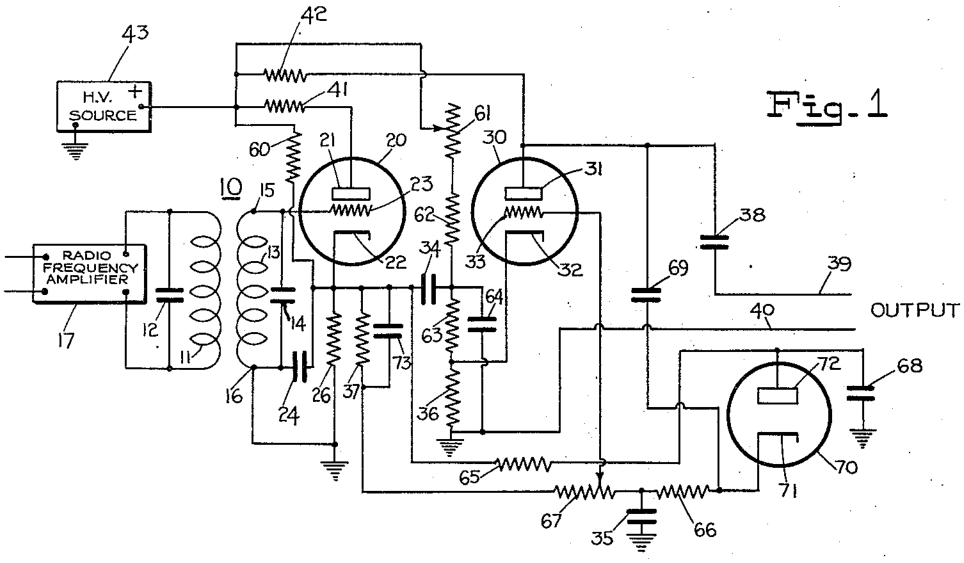
Figure 2:
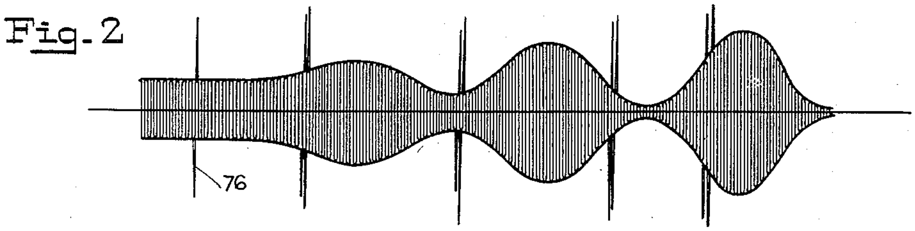
Fig. 2 is an illustration of a modulated carrier wave having spurious interference energy shown thereon.

In the drawing, the reference character 10 represents a transformer, having a primary winding 11 and a secondary winding 13 in which the primary winding is adapted to be energized by incoming modulated carrier waves from a radio frequency amplifier indicated by the block 17. A condenser 12 is connected across the primary winding 11 and constitutes, in combination with the primary winding, a resonant circuit which is tuned substantially to resonance at a frequency equal to the frequency of the incoming carrier waves. Similarly, a condenser 14 is connected across the secondary winding 13 and constitutes, in combination therewith, a resonant circuit which is tuned substantially to resonance at a frequency equal to the incoming carrier wave frequency. The energy from the transformer 10 is detected by a detector tube 20 having a plate 21, a cathode 22 and a grid 23 which is connected directly to the upper terminal 15 of the secondary winding 13 of the transformer 10. The grid 23 has infinite impedance with respect to ground. The cathode 22 is connected to the lower terminal 16 of the secondary winding 13 by a high frequency by-pass condenser 24. The cathode 22 is connected to ground through a resistor 26. The resistor 26 is a detector load resistor. The plate 21 of the detector tube 20 is connected to a high voltage source 43 through a plate high frequency impedance 41. The detector tube 20 feeds detected audio energy into an amplifier 30 which functions both as an inverted amplifier and an audio controlled voltage limiter. The amplifier tube 30 comprises a plate 31, a cathode 32 and a grid 33. The cathode 32 of the tube 30 is coupled to the cathode 22 of the tube 20 through a low frequency coupling condenser 34 and a high frequency decoupling resistor or high frequency impedance 63. The cathode 32 of the tube 30 is connected to ground through a cathode biasing resistor 36. The grid 33 of the tube 30 is coupled to ground through a high frequency control balancing resistor 67 and a low frequency by-pass condenser 35. The grid 33 is also connected to the cathode 22 of the tube 20 through a grid resistor 37 which has a high frequency coupling condenser 73 connected there-across. The resistor 37 and condenser 73 form an RC network preferably having a time constant such as to supply an increased amount of higher audio frequency energy to the grid 33. This increased excitation preferably occurs at about 3000 cycles. The audio output of the amplifier tube 30 appears across the output conductors 39 and 40 and the condenser 38 constitutes an output coupling condenser. The plate 31 is connected to the high voltage source 43 through a plate load resistor 42.

The cathode 22 of the tube 20 is connected to the high voltage source 43 through a voltage dropping resistor 60 which functions to maintain the bias on the cathode 22 at a predetermined level when the carrier does not exist. The cathode 32 of the tube 30 is connected to the high voltage source 43 through a high frequency decoupling resistor 63, a voltage dropping resistor 62 and an adjustable biasing resistor 61. The resistors 63, 62 and 61 are all connected in series. The biasing of the cathode 32 of the tube 30 is controlled principally by the resistors 61 and 62 and may be manually adjusted by the resistor 61. The resistor 63 is a decoupling resistor for high frequencies. The resistors 63 and 36 have a high frequency by-pass condenser 64 connected thereacross. The resistors 63 and 36 and the condenser 64 form an RC network preferably having a time constant such as to reduce the higher audio frequencies applied to the cathode 32. Such reduction of excitation preferably takes place at about 3000 cycles, hence the resistor 63 has been termed a high frequency decoupling resistor.

A portion of the energy from the output of the amplifier tube 30 is rectified by a diode rectifier 70 having a cathode 71 and a plate 72. The cathode 71 is coupled to the plate 31 of the tube 30 through a low frequency coupling condenser 69. The plate 72 of the rectifier tube 70 is by-passed to ground through a low frequency by-pass condenser 68. The cathode 71 of the rectifier tube 70 is also connected to the grid circuit of the tube 30 through a low frequency isolating resistor 66. The anode 72 is connected to the juncture of resistor 37 and condenser 34 by a filter resistor 65.

Figure 3:
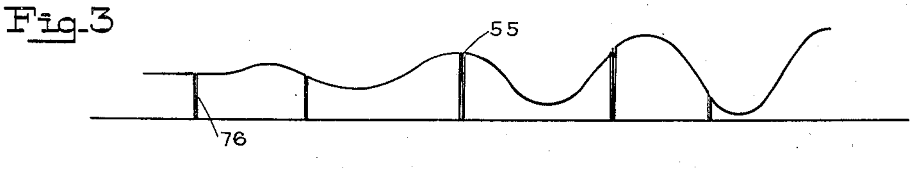
Fig. 3 is the representation of an inverse audio wave which has been amplified and limited after detection of the wave in Fig. 2.

In operation, during the periods of the positive half of the modulation cycles of the modulated carrier waves, the grid 23 of the detector tube is biased more positive, with the result that an increased amount of current flows between the cathode 22 and the plate 21. The flow of current through the detector tube is proportional to the amplitude of the modulation envelope of the modulated carrier wave and thus modulated frequency energy appears in the cathode 22. This modulated frequency energy is fed to the cathode 32 of the amplifier through the low frequency coupling condenser 34 and the resistor 63. The grid 33 of the amplifier tube 30 is held at ground potential for modulated frequency waves through the low frequency by-pass condenser 35 when the adjustable pointer is on the capacitor by-passed end of the resistor 67. When the grid 23 swings more positive, the tube 20 passes more current, and the cathode end of resistor 26 becomes more positive which biases the cathode 32 in a more positive direction to cause the tube 30 to pass less current. Therefore, the grid 33 and the cathode 32 are inversely excited by energy from the detector tube 20. The output of the amplifier 30 generates an audio voltage wave which is inversely proportional to the modulation envelope of the modulated carrier wave. Fig. 3 shows an audio frequency wave which may be a representation of the voltage output of the amplifier tube 30. The amplifier tube 30 is biased with direct current through the resistor 37 and the resistor 67 and the current flowing within the tube 30 will be proportional to the voltage change across 26 which is, in turn, proportional to the carrier wave energy. With no carrier wave frequency impressed on the transformer 10 the grid 33 of the tube 30 is adjusted to a point of cut-off by the adjustable resistor 61. Thus with no carrier wave energy on the transformer 10 the grid 23 and the cathode 22 are so biased as to prohibit the flow of any current through the cathode-to-plate circuit 32—31. With respect to the detector tube 20, when there is no carrier wave energy on the transformer 10 the grid 23 and the cathode 22 are so biased as to allow a small amount of direct current to flow through the cathode-to-plate circuit 22—21. This small amount of direct current flowing through the resistor 26 when no carrier wave energy is applied to the transformer 10, produces a positive bias on the grid 33 since it is connected to the cathode 22 through the resistor 37. This positive bias on the grid 33 is very much less than the negative bias on the grid 33 relative to the cathode 32 caused by current flow through the resistor 36 from the source 43 and hence by proper adjustment of the adjustable resistor 61 the amplifier tube may be biased to cut-off. When the spurious interference wave appears at a time when no carrier wave energy is being applied to the transformer 10 then this spurious wave energy cannot pass through the amplifier tube 30 because the inverse amplification action of the amplifier tube cuts-off the spurious energy waves from passing through the tube 30. This is true, since the tube 30 is at cut-off, and a spurious wave on grid 23 will drive it positive, and the increased positive voltage on resistance 26 biases the cathode 32 more positive to merely cut off the tube 30 still further.

Figure 4:
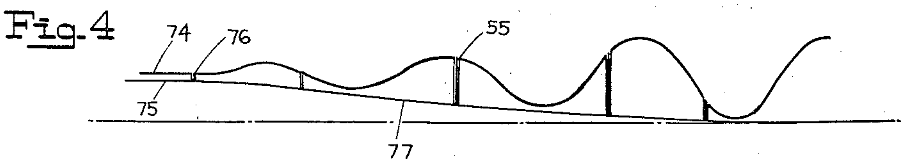
Fig. 4 is a representation of an audio wave as shown in Fig. 3 but illustrating the manner in which the amplifier tube limits the cut-off of the tube in accordance with audio power changes.

In operation, when one is tuning between stations there is not the usual crackling and noise generated in my system. When a spurious interference wave appears at a time when the carrier wave energy is being applied to the transformer 10 the grid 33 of the amplifying tube 30 is biased above cut-off, by decreasing the negative grid voltage, and thereby permits a small amount of energy to flow from the cathode 32 to the plate 31. The grid 33 is biased above the point of cut-off upon the appearance of the carrier in the transformer 10 since the cathode 22 of the tube 20 becomes positive by the detected carrier wave energy. While the detected carrier wave energy on the cathode 32 biases the grid 33 of the tube 30 above the point of cut-off, it is to be noted that at the same time the resistor 61 tends to prevent the grid 33 from being biased more positive than the point of cut-off. Therefore, the bias of the grid 33 when carrier wave energy only appears on the transformer 10 is the result of the combination of both the action of the detected positive energy on the cathode 22 and the negative energy from the cathode bias of the amplifier tube 30 effected through the resistor 62 and the adjustable resistor 61. Accordingly when the carrier wave is present a small amount of current flows from the cathode-to-plate in the amplifier tube 30. In Fig. 4 the distance between the substantially straight parallel lines 74 and 75 represent the amplitude of the energy flowing through the amplifier tube 30 when the carrier only is present. Should a spurious interference wave appear such as the wave 76, then the amount of the energy of this spurious wave which may pass through the amplifier tube 30 is limited to a very low value. Thus substantially all of the so-called background noise on the unmodulated carrier wave is suppressed.

When a modulated carrier wave appears in the transformer 10, then the amplifier tube functions as a biasing expander whereby the modulation energy may flow through the amplifier tube 30. The biasing expanding action of the tube 30 is accomplished through the action of the diode rectifier 70 which rectifies a portion of the output energy of the tube 30, which rectified energy affects the bias of the grid 33. The reason that the rectified energy affects the bias of the grid 33 is that the rectified current flows through the grid resistor 37 and thereby makes the grid 33 proportionately more positive in substantially direct accordance with the mean energy of the audio wave. Thus the line 77 in Fig. 4 represents the change in bias on the grid 33 as affected by the rectifier 70. Should a spurious interference wave appear when the carrier wave is being modulated then the amount of the spurious interference energy which may be passed by the amplifier tube 30 is controlled by the mean energy of the modulated envelope of the carrier. The interference energy is expanded as well as the modulated carrier energy by the action of the rectifier tube 70, yet the value of the interference energy is limited to the mean amplitude of the modulated carrier wave. Thus under conditions of modulated carrier waves the amplitude of the spurious energies is limited in accordance with the mean power of the modulated carrier wave. From the appearance upon an oscilloscope the maximum amplitude of the spurious interference waves, as limited by the amplifier 30, may be said to follow the envelope of the modulated carrier wave but with a smaller amplitude than the modulated carrier wave. In other words, under the most unfavourable conditions the amplitude of the spurious wave energy as it appears upon the oscilloscope have relative changes in accordance with the changes of the modulated carrier wave but the amplitude of the relative changes of the spurious interference energy is less than the amplitude of the modulated carrier wave. The modulation energy controls the noise peaks instead of the noise peaks controlling the amplitude of the modulation energy. In as much as the amplifier 30 is an inverse amplifier the energy interference waves which are not cut off appear as negative energy in the audio out-put circuit 39—40. This negative energy appears as slots or depressions in the audio wave such, for example, as at 55 in Figs. 3 and 4.

In my invention the so-called background noise which is produced by low amplitude, high frequency interference waves is balanced out by the adjustable resistor 67. The point of balance on the resistor 67 can be found wherein the high frequency energy from the spurious waves on the resistor 67 from the coupling condenser 73 will be of the same amplitude and phase relation as the high frequencies appearing on the cathode 32 through the coupling condenser 34 and resistor 63. Thus the equal, and in phase, energy on the grid 33 and on the cathode 32 does not excite the amplifier 30 and thereby prevents the high frequency, low amplitude energy from flowing to the output.

Summarizing, the grid 33 and the cathode 32 of the tube 30 are both excited. The cathode 32 is excited by low frequency and a small amount of undesirable high frequency energy. The grid 33 is excited only by high frequency energy to balance out the high frequency on the cathode. For low frequency excitation the cathode 32 is affected by the low frequency voltage appearing on the cathode 22. The high frequency excitation on the cathode is of a small amount, since it is reduced to a minimum by the high frequency decoupling resistor 63. This small amount of high frequency energy exciting the cathode 32 is balanced out by the balancing resistor 67 whereby a small amount of equivalent high frequency energy of the same phase is applied to the grid 33.

The high frequency excitation of the grid 33 is obtained from the high frequency coupling condenser 73. The bias of the grid 33 is affected both by the positive detected potential on the cathode 22 of the tube 20 and by the action of the diode rectified current flowing through the resistor 37. The double control of the bias of the grid 33 makes the amplifying tube responsive to both the carrier change and the audio change. Further, the control of the grid 33 from the carrier wave bias energy derived across resistance 26 when grid 23 is excited, produces a positive bias through resistances 37 and 67 to the grid 33. This positive bias releases the tube 30 from a cut off condition which was originally caused by the voltage drop across resistance 36 effected by the current flowing through the resistances 61, 62 and 63. The amplifier tube 30 is then responsive to noise and modulation from the detector tube 20, with frequencies below 3000 cycles, e. g., exciting the cathode 32, and with the control grid 33 at a relatively constant potential because of the capacity 35, the resulting amplification will produce frequencies below 3000 cycles on the capacities 38 and 69. These initial waves are of low amplitude until the energy begins to rectify across the tube 70, which then creates an additional positive bias through the dropping resistance 37, and also 67, whereby the grid 33 becomes more positive and the tube 30 operates as a normal amplifier with a starting and stopping delay on expansion equivalent to the time constant effected by the combined resistance of the load circuit of the tube 70 and capacities 35 and 68. The figure of 3000 cycles at which point the neutralization by simultaneous excitation of the grid 33 and cathode 32 occurs, is merely for purposes of illustration. Such a frequency would be satisfactory for the communications type of receivers where only voice communication is contemplated. For ordinary broadcast receivers, this figure could be raised to any desired point and could even be elevated out of the audio range.

Although I have shown and described my invention with a certain degree of particularity, it is understood that changes may be made therein without departing from the spirit of the invention which are included within the scope of the claims hereinafter set forth.

I claim as my invention:

1. An audio controlled limiter comprising, in combination, a detector circuit having at least a cathode, an inverter amplifier tube having at least a plate, a cathode and a grid, means for coupling the cathode of the amplifier to the cathode of the detector for low frequency, said cathode of the detector having a cathode load resistor for connecting the cathode to ground, resistor means for connecting the grid of the amplifier tube to the cathode of the detector, means for rectifying a portion of the output energy of the amplifier tube, and means for conducting the rectified energy through said resistor means and thereby varying the bias of the grid of the amplifier tube.

2. An audio controlled limiter comprising, in combination, a detector circuit having at least a cathode, an inverter amplifier tube having at least a plate, a cathode and a grid, means for coupling the cathode of the amplifier to the cathode of the detector for low frequency, first resistor means for connecting the grid of the amplifier to the cathode of the detector, second resistor means for biasing the cathode of the amplifier with reference to the grid, said first and second resistor means effecting a relative bias between the grid and the cathode, said second resistor means biasing the cathode with respect to the grid at substantially cut-off of the amplifier tube when no carrier wave energy appears in the detector circuit, said grid being biased above the point of cut-off by reducing the bias between the grid and the cathode by the appearance of carrier wave energy in the detector circuit, and means responsive to the output of the amplifier tube for varying the action of the first resistor means on the grid of the amplifier tube.

3. An amplifier comprising an amplifier tube having at least a cathode, a plate and a control grid, a source of modulated carrier waves, detector means for exciting the cathode by modulation frequency energy, biasing means for biasing the control grid, said biasing means comprising first means responsive to the carrier wave energy and second means responsive to modulation wave energy, said cathode excitation supplied by the detector including undesired high frequency energy, and means for exciting the grid by energy substantially identical to said undesired high frequency energy.

4. An amplifier for amplifying the intelligence of a carrier wave, said amplifier including a cathode-to-grid circuit and an anode and including an output circuit connected to said anode, excitation means for impressing intelligence to be amplified on the cathode of said circuit, said excitation means also passing high audio frequency energy, second means including a resistance for impressing high audio frequency energy on the grid of said circuit in an amount and phase relationship substantially to suppress any high audio frequency energy in the output of said amplifier, a rectifier connected to receive the amplified intelligence from said amplifier anode, and biasing means for utilizing the rectified energy from said rectifier to change the voltage drop across said resistance to vary the gain of said amplifier.

5. A radio circuit including a source of modulated radio frequency, a detector device for detecting the modulated signal of said radio frequency wave, an amplifier circuit for amplifying the modulated signal, said amplifier circuit having electron emitting and control means, first means for impressing upon the electron emitting means the modulated signal output from said detector device to produce an output from said amplifier circuit that has an inverted modulation envelope relative to said detector output, said first means also passing a first small high audio frequency component, second means for impressing a second small high audio frequency component upon said electron control means for substantially balancing out said first small high audio frequency component, and biasing means including a rectifier for varying the gain of said amplifier circuit in accordance with the mean power of the modulation signal, said rectifier impressing a voltage on said amplifier through said second means.

6. A radio circuit including a source of modulated radio frequency, a detector device for detecting the modulated signal of said radio frequency wave, an amplifier circuit for amplifying the modulated signal, first means for impressing upon the amplifier circuit the modulated signal output from said detector device to produce an output from said amplifier circuit that has an inverted modulation envelope relative to said detector output, said first means also passing a first small high audio frequency component, second means for impressing a second small high audio frequency component upon said amplifier circuit for substantially balancing out said first small high audio frequency component, said second means including a resistor, and biasing means for varying the gain of said amplifier circuit in accordance with the mean power of the modulation signal, said biasing means including a rectifier device connected to receive energy from the amplifier circuit and applying energy to said resistor to change the voltage drop thereacross.

7. An amplifier circuit having a point of reference potential and comprising an amplifier tube having a cathode, a plate and a grid, a source of low frequency energy and of high frequency energy having one terminal thereof connected to said point of reference potential, first circuit means including a low frequency coupling condenser and a high frequency impedance for connecting the cathode to another terminal of said source, a high frequency coupling condenser, a potentiometer and a low frequency bypass condenser serially connected between said another terminal of said source and the point of reference potential, respectively, second circuit means including a variable tap on said potentiometer for connecting the grid to said another terminal of said source through a part of said potentiometer and said high frequency coupling condenser, whereby adjustment of the variable tap of said potentiometer will establish substantially equal impedances in said first and second circuit means to high frequency energy to cause high frequency energy of the same phase and equal amplitude to appear respectively on the cathode and the grid.

DONALD L. HINGS.

REFERENCES CITED

The following references are of record in the file of this patent:

UNITED STATES PATENTS

| Number | Name | Date |
|---|---|---|
| 1,909,239 | Travis | May 16, 1933 |
| 1,950,145 | Hentschel | Mar. 6, 1934 |
| 1,978,552 | Runge | Oct. 30, 1934 |
| 2,031,238 | Thompson | Feb. 18, 1936 |
| 2,034,497 | Travis | Mar. 17, 1936 |
| 2,116,696 | de Monge | May 10, 1938 |
| 2,245,674 | Huetwohl | June 17, 1941 |
| 2,264,724 | Schonfeld | Dec. 2, 1941 |
| 2,284,102 | Rosencrans | May 26, 1942 |
| 2,319,663 | Crowley | May 18, 1943 |
| 2,374,071 | Barton | Apr. 17, 1945 |
| 2,395,770 | Wilkomerson | Feb. 26, 1946 |

FOREIGN PATENTS

| Number | Country | Date |
|---|---|---|
| 492,407 | Great Britain | Sept. 20, 1938 |
| 94,093 | Sweden | Jan. 9, 1939 |